United States Patent [19]

Colburn

[11] 4,075,060

[45] Feb. 21, 1978

[54] METHOD FOR REMOVING FISSION PRODUCTS FROM A NUCLEAR REACTOR COOLANT

[75] Inventor: Richard P. Colburn, Youngwood, Pa.

[73] Assignee: Westinghouse Electric Corporation, Pittsburgh, Pa.

[21] Appl. No.: 493,368

[22] Filed: July 31, 1974

Related U.S. Application Data

[63] Continuation of Ser. No. 261,476, June 9, 1972, now Defensive Publication No. T921,014.

[51] Int. Cl.$^2$ .......................... G21C 19/32; G21F 9/04
[52] U.S. Cl. ..................................... 176/37; 176/92 B
[58] Field of Search .......................... 176/16, 37, 92 B; 75/65 R, 66

[56] References Cited

U.S. PATENT DOCUMENTS 3,693,959  9/1972  Swinhoe et al. ...................... 266/37

FOREIGN PATENT DOCUMENTS 691,052  1/1969  Japan.

OTHER PUBLICATIONS

Trans. Am. Nucl. Soc. 12: 611–612, (Nov. 1969), "Cs Cold Trapping in a Forced-Convection Na. System".
Atomic Energy (USSR), 19: 298–300, Sept. 1965.

Primary Examiner—Samuel W. Engle
Assistant Examiner—Ralph Palo
Attorney, Agent, or Firm—D. C. Abeles; Z. L. Dermer

[57] ABSTRACT

A method for removing cesium 137, iodine 131 and tritium from a liquid sodium reactor coolant. Hydrogen is introduced into the liquid sodium causing sodium hydride to precipitate in a cold trap. The cesium iodine and tritium isotopes are removed from the liquid sodium by coprecipitating as impurities in the sodium hydride.

14 Claims, 1 Drawing Figure

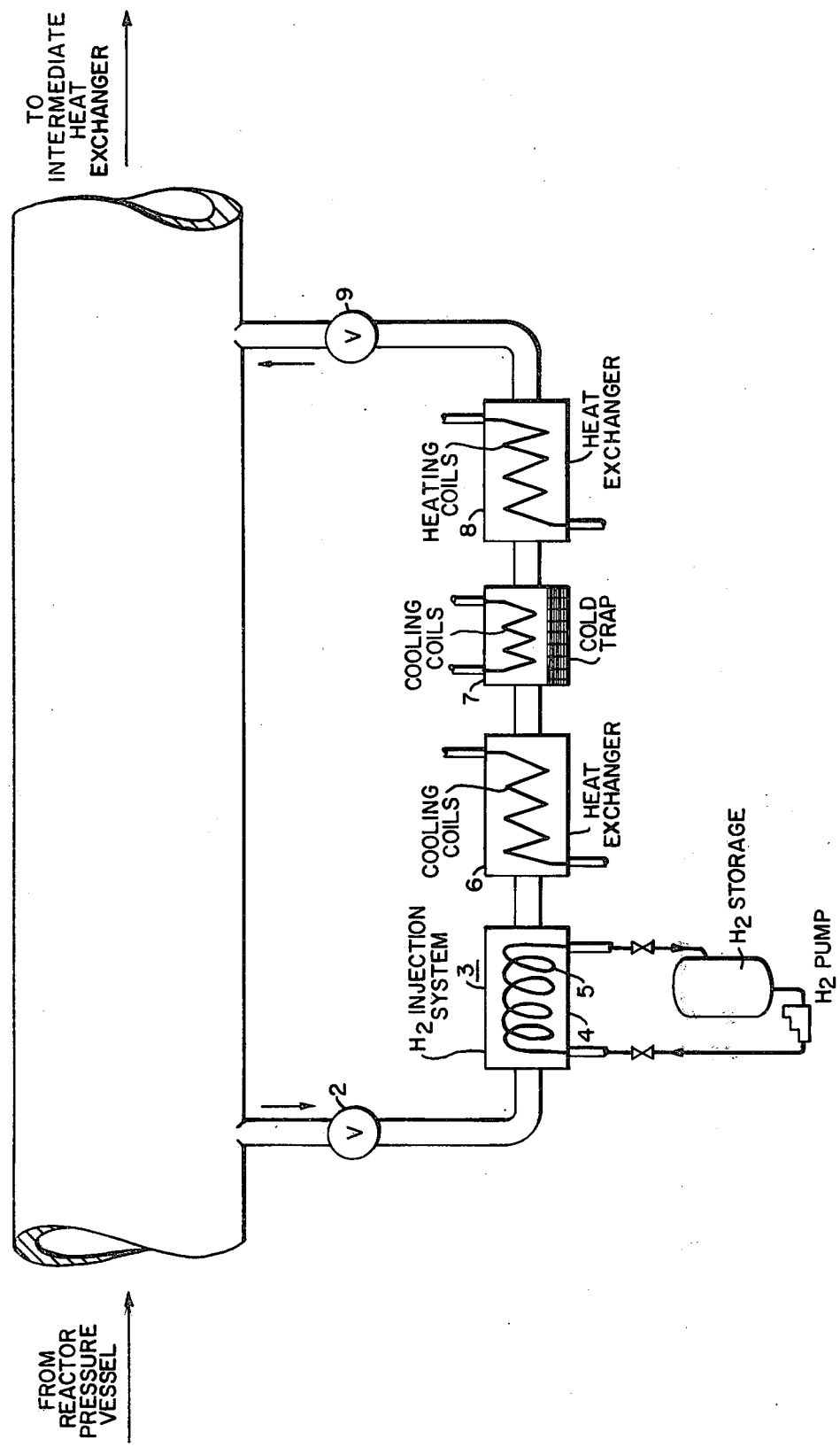

METHOD FOR REMOVING FISSION PRODUCTS FROM A NUCLEAR REACTOR COOLANT

This is a continuation of application Ser. No. 261,476 filed June 9, 1972, now Defensive Publication T921,014.

BACKGROUND OF THE INVENTION

This invention relates generally to nuclear reactors and more particularly to health and safety systems and methods for removal of fission products from the coolant of such nuclear reactors. A nuclear reactor is an apparatus designed and operated for the purpose of initiating and maintaining a nuclear fission chain reaction in a fissile material for the generation of heat for power purposes. In the type of nuclear reactor described herein, fissile materials such as plutonium 239 and uranium 238, are contained within fuel elements. A plurality of fuel elements comprise a nuclear core which is structurally supported within a hermetically sealed pressure vessel. A reactor coolant, such as liquid sodium, is circulated into the pressure vessel and through the nuclear core where the heat generated by nuclear fission is transferred from the fuel elements to the reactor coolant. The heated reactor coolant exits from the pressure vessel and flows to a heat exchanger where the heat previously acquired is transferred to another reactor flow system coupled in sealing arrangement with the heat exchanger. The cooled liquid sodium exits from the heat exchanger and flows to a pump which again circulates the reactor coolant into the pressure vessel repeating the above described flow cycle. The system comprising the nuclear core, pressure vessel, heat exchanger, circulation pump, and the connecting piping is commonly referred to as the primary system.

The heat which is transferred from the reactor coolant on flowing through the heat exchanger is eventually transformed into stream which is converted into electrical energy by means of conventional steam generator, steam turbine, electrical generator apparatus. This system by which the heat is converted into electricity is known as the secondary system.

An intermediate system is sometimes included between the primary and secondary systems of the nuclear reactor for the purpose of reactor safety. Like the primary system, the intermediate system is completely closed and contains a coolant such as liquid sodium. The intermediate system comprises a heat exchanger, a pump for coolant circulation and connecting piping.

The fuel assemblies of the nuclear core of the type of nuclear reactor considered herein may include fuel elements or pins which are either vented or unvented. In the former, fuel pellets containing various isotopes of uranium and plutonium are housed within unsealed or vented cladding tubes formed from a corrosion resistant material, such as stainless steel. In the latter type of fuel element the fuel pellets are encapsulated in sealed cladding tubes. The type of fuel element that a particular nuclear reactor will use depends in part upon treatment to be afforded to a gas which is generated by the fission process. The fission gas generated by the fission process contains radioactive fission products such as cesium 137, iodine 131 and tritium. Tritium readily diffuses through the fuel element cladding at the reactor operating temperature; therefore, as regards the subsequent treatment of tritium, it is immaterial whether vented or unvented fuel elements are used. In either case tritium is released directly to the reactor coolant. If vented fuel elements are used the radioactive cesium and iodine isotopes are also released directly to the reactor coolant. The unvented fuel elements prevent direct release of the radioactive isotopes. However, in the unlikely but possible event of a rupture of a cladding tube, the unvented elements also may release cesium 137 and iodine 131. It is therefore possible for the reactor coolant to become contaminated with radioactive tritium, cesium 137 and iodine 131 not withstanding which type of fuel element is used in the nuclear core.

The health and safety problem is caused mainly by deposition of the radioactive cesium 137 and iodine 131 onto all surfaces in the primary system with which the contaminated reactor coolant comes in contact and subsequent exposure of personnel to the contaminated surfaces. This includes the surfaces of such apparatus as the reactor pressure vessel, the pressure vessel closure head, main reactor coolant circulating pumps, heat exchangers, connecting piping, valves, and like apparatus. During normal reactor operation this problem does not exist because operational personnel do not normally expose themselves to the radioactive primary system components. But, during such operations as reactor refueling reactor maintenance and primary system repairs, personnel might expose themselves to the radioactive components and a health and safety problem can exist.

The radioactive isotope tritium is a separate problem. As previously explained, at reactor operating temperatures the tritium readily diffuses through thin members such as fuel element cladding. Tritium can therefore diffuse through the tubing of the primary system heat exchanger and contaminate the intermediate system as well as the primary system which increases the possibility of personnel exposure.

In the prior art, the reactor coolant comprising liquid sodium, is partially purified of the fission product contamination by a cold trapping technique. Cold trapping is a process for removing solutes or dissolved substances from a solution. By sufficiently lowering the temperature of the solution, the solubility of the dissolved substance decreases to the level that the solute will crystallize and precipitate out of solution. The solvent or the substance within which the solute is dissolved will remain in liquid form. While this cold trapping process has been effectively used to remove non-radioactive contaminants, such as hydrogen, from a reactor coolant, it has been only marginally effective in removing radioactive fission products, such as cesium 137 iodine 131 and tritium, from a reactor coolant. Therefore, in the prior art, the health and safety problem mentioned above was not effectively elmininated.

SUMMARY OF THE INVENTION

In accordance with this invention, a primary system of a nuclear reactor such as a liquid metal-cooled fast breeder nuclear reactor includes a purification bypass flow system having a means which effectively removes radioactive fission products from the reactor coolant. The purification bypass flow system comprises a separate flow system coupled in parallel with the primary system of the nuclear reactor. It allows a small portion of the contaminated reactor coolant to be bypassed from the primary system, purified of the contaminants and then returned to the primary system. Continued operation of the bypass flow system reduces the concentration of the fission products so that the overall radioactivity of the reactor coolant is reduced to a safe level. Consequently, the deposition of the fission products is reduced and the resulting radioactivity of the primary system components is also reduced to a safe level.

The bypass flow system includes apparatus to introduce hydrogen, at a controlled rate, into the reactor coolant flowing therein. A suitable example of such apparatus comprises thin walled stainless steel tubing which becomes permeable to hydrogen at the operating temperature of the reactor coolant. The reactor coolant flows past the thin walled tubing and absorbs a predetermined quantity of hydrogen. The hydrogen, tritium, cesium and iodine comprising the reactor coolant contaminants remain as ions in the liquid sodium. Upon lowering the temperature of the liquid sodium and the contaminants contained therein, sodium hydride precipitates out of solution. It has been found that this precipitate contains cesium 137, iodine 131 and tritium ions. The precipitation occurs in a solid form in an apparatus provided therefore and commonly referred to as a cold trap.

Thus, by intentionally adding hydrogen, which itself is a contaminant, above the normal concentration present in the sodium, and then precipitating the hydrogen out of solution the coprecipitation of the iodine, cesium and tritium radioactive isotopes is enhanced. In this manner, the reactor coolant is effectively purified of radioactive contaminants, thereby preventing the primary and the intermediate systems from becoming radioactive and eliminates the possible health and safety problem of the prior art.

BRIEF DESCRIPTION OF THE DRAWING

Other advantages of the invention will be apparent from the following detailed description taken in consideration with the accompanying drawing, in which the single FIGURE is a schematic of the purification bypass flow system.

DESCRIPTION OF THE PREFERRED EMBODIMENTS

Referring now to the drawing, a reactor coolant, such as liquid sodium, is heated to reactor operating temperature on passage through a nuclear core contained within a reactor pressure vessel. The hot liquid sodium exists from the reactor pressure vessel and enters a main reactor coolant flow line 1. The bulk of the reactor coolant flows through the main reactor coolant flow line 1 to an intermediate heat exchanger (not shown). The remainder of the reactor coolant enters the bypass purification system through an inlet valve 2.

The flow distribution of reactor coolant between the main reactor coolant flow line 1 and the purification bypass system depends upon the means employed. In the exampleshown by the drawing, the flow distribution is obtained by the relationship between the pressure drop due to the purification bypass system and the pressure drop due to the flow in the main reactor coolant flow line 1. There are a number of other means available, within the current state of the art, to adjust this flow distribution. One such means is to pump the reactor coolant through the purification bypass system by a circulating pump installed in the purification bypass system. Another means is to restrict the flow in the main coolant flow line 1 by, for example, an orifice causing a greater portion of reactor coolant to flow through the purification bypass system.

Within the purification bypass system, the portion of bypassed reactor coolant flows through a hydrogen injecting system 3, where hydrogen is introduced into the liquid sodium. One type of hydrogen injection system 3 comprises an outer shell 4 which serves as a containment vessel for the flowing sodium, thin walled tubing 5 for injecting the hydrogen into the liquid sodium and means and apparatus to store, pressurize and circulate the flow of hydrogen. The thin walled tubing 5 is located within the outer shell 4 and is mounted in sealing relationship with the outer shell 4 to isolate the interior of shell 4 from the interior of tubing 5. The tubing 5 is fabricated, such as by coiling, to permit passage of the reactor coolant past the outside surface of the tubing 5 while allowing unrestricted flow of hydrogen within the tubing 5. The wall of the tubing 5 is approximately 15 mils thick; therefore, at 1000° F, which is approximately the operating temperature of the reactor coolant, the tubing 5 is permeable to hydrogen. The pressure of the hydrogen within the thin walled tubing 5 is higher than the partial pressure of the hydrogen in the reactor coolant so that the flow of hydrogen is into the reactor coolant.

Upon exiting from the hydrogen injection system 3, the reactor coolant, comprising liquid sodium, still contains the radioactive fission products iodine 131, cesium 137 and tritium. Now however, the liquid sodium contains an additional contaminant, hydrogen. The temperature of the reactor coolant is then lowered to approximately 300° F on passage through a cooling means such as a heat exchanger 6. The reactor coolant exits from the heat exchanger 6 and enters a cold trap 7 where further cooling takes place and the iodine, cesium, tritium and hydrogen contaminants are removed. Within the cold trap 7, the liquid sodium is again cooled, but this time to approximately 250° F, at which temperature the contaminants become solid. The contaminants, iodine, cesium and hydrogen, now in a solid form, precipitate out of solution onto a suitable removal device such as a wire mesh surface 10 provided within the cold trap 7. As explained above, it has been found that sodium hydride, which is one of the principal substances precipitated, contains the radioactive fission products. The cesium, iodine and tritium ions exist as impurities in the precipitated sodium hydride. A cesium ion replaces a sodium ion while the iodine and tritium ions replace hydrogen ion within the crystalline structure of the sodium hydride. Thus, the more sodium hydride that is precipitated, the more radioactive fission products that are removed. After being purified, the liquid sodium is reheated to the reactor outlet temperature of approximately 1000° F by suitable heating means such as a heat exchanger 8. The reactor coolant then flows through an inlet valve 9 prior to being reintroduced into the main reactor coolant flow line where it continues along with the bulk of the reactor coolant, to the intermediate heat exchanger.

As previously explained, the reactor coolant flowing in the purification bypass system is only a portion of the total reactor coolant flow. Therefore, in theory, the reactor coolant is not purified of all the radioactive fission products. But, continued operation of the purification bypass system lowers the concentration of fission products in the total reactor coolant to an effectively safe level. An effectively safe level is a level at which subsequent deposition of the fission product on the apparatus in the primary system or release of the fission products to the intermediate system does not constitute a health and safety problem.

From the foregoing description, taken in connection with the drawing, it is seen that this invention provides a means to effectively remove radioactive fission products, comprising cesium 137 iodine 131 and tritium from the liquid sodium coolant of a liquid metal-cooled fast breeder nuclear reactor.

Since numerous changes may be made in the above described apparatus, different embodiments of the invention may be made without departing from the spirit and scope thereof. It is intended that all the matter contained in the foregoing description or shown in the accompanying drawing shall be interpreted as illustrative and not in a limiting sense.

I claim as my invention:

1. A method for removing fission products from a liquid metal reactor coolant of a nuclear reactor, said method comprising the steps of diverting a portion of said reactor coolant from a main stream of said nuclear reactor to a bypass system, adding hydrogen to said bypassed reactor coolant, then lowering the temperature of said bypassed reactor coolant, precipitating said fission products from said bypassed reactor coolant and reintroducing said bypassed reactor coolant into said main stream without the precipitates.

2. The method of claim 1 including the additional step of removing said precipitated fission products from said bypass system.

3. The method of claim 1 wherein precipitating said fission products comprises precipitating a compound of ssaid reactor coolant and said added hydrogen, said fission products precipitating as impurities within said reactor coolant-hydrogen precipitant.

4. The method of claim 1 wherein said reactor coolant is liquid sodium.

5. The method of claim 1 wherein said fission products are cesium 137, iodine 131 and tritium.

6. The method of claim 4 wherein said reactor coolant-hydrogen precipitant is sodium hydride with fission product impurities.

7. The method of claim 6 wherein said fission product impurity in said sodium hydride precipitant is cesium.

8. The method of claim 6 wherein said fission product impurity in said sodium hydride precipitant is iodine.

9. The method of claim 6 wherein said fission product impurity in said sodium hydride precipitant is tritium.

10. A system for removing fission products from a liquid metal reactor coolant circulating through a primary system of a nuclear reactor comprising means connected to said primary system for bypassing a portion of said reactor coolant from said primary system and returning said portion of said reactor coolant to said primary system and apparatus in said bypassing means for removing said fission products from said bypassed reactor coolant, said apparatus for removing said fission products comprising means for adding hydrogen to said reactor coolant, a cooling device connected to said hydrogen adding means for lowering the temperature of said reactor coolant, and a precipitator connected to said cooling device for precipitating and collecting said fission products from said reactor coolant and removing said precipitates from the coolant before returning said portion of said coolant to said primary system.

11. The system of claim 10 wherein said apparatus for removing said fission products from said bypassed reactor coolant includes heating means connected to said precipitator for raising the temperature of said bypassed reactor coolant with said fission products removed.

12. The system of claim 10 wherein said means for adding hydrogen to said reactor coolant comprises an outer shell for containing said reactor coolant flowing therein and thin walled tubing contained within said outer shell for adding hydrogen to said reactor coolant, said tubing being connected to said outer shell in sealing fashion separating the interior of said outer shell from the interior of said tubing, said thin walled tubing being permeable to said hydrogen flowing therein at the operating temperature of said reactor coolant, said means for adding hydrogen further comprising a container connected to said tubing for storing said hydrogen, and a pumping means connected to said container for pumping said hydrogen through said hydrogen adding means.

13. The system of claim 11 wherein said precipitator for precipitating and collecting said precipitated fission products comprises an outer shell for containing said reactor coolant flowing therein, a cooling means connected to said precipitator for lowering the temperature of said reactor coolant, and a collecting means contained within said outer shell for collecting said precipitated fission products.

14. The system of claim 13 wherein said fission product collecting means is wire mesh, said wire mesh serving as a depository surface for said precipitated fission products.

* * * * *